(12) United States Patent
Ware et al.

(10) Patent No.: US 12,469,403 B1
(45) Date of Patent: Nov. 11, 2025

(54) INTERACTIVE EDUCATIONAL TOOL

(71) Applicants: Holly L. Ware, Fort Worth, TX (US); Brenda James, Fort Worth, TX (US)

(72) Inventors: Holly L. Ware, Fort Worth, TX (US); Brenda James, Fort Worth, TX (US)

( * ) Notice: Subject to any disclaimer, the term of this patent is extended or adjusted under 35 U.S.C. 154(b) by 931 days.

(21) Appl. No.: 17/592,607

(22) Filed: Feb. 4, 2022

Related U.S. Application Data

(60) Provisional application No. 63/146,594, filed on Feb. 6, 2021.

(51) Int. Cl.
*G09B 5/06* (2006.01)
*E05B 65/00* (2006.01)
*G09B 1/08* (2006.01)

(52) U.S. Cl.
CPC ............... *G09B 5/06* (2013.01); *G09B 1/08* (2013.01); *E05B 65/0014* (2013.01)

(58) Field of Classification Search
CPC ... G09B 5/06; G09B 1/00; G09B 1/08; G09B 17/00; G09B 17/006; G09B 19/00; A47F 3/00; A63F 9/001; A63F 9/34; A63F 2250/30; A63H 2200/00; A63H 33/006; A63H 33/04; A63H 33/046; A63H 33/22; A63H 33/26; A63H 33/32; A63H 33/42; A63H 5/00; E05B 65/0014
USPC ................................. 434/169, 295, 296, 308
See application file for complete search history.

(56) References Cited

U.S. PATENT DOCUMENTS

| | | | |
|---|---|---|---|
| 5,188,533 A * | 2/1993 | Wood .................. | G09B 1/06 434/335 |
| 5,323,370 A * | 6/1994 | Davison ............... | G11B 33/06 446/143 |
| 5,511,980 A * | 4/1996 | Wood .................. | G09B 1/04 434/167 |
| 5,813,861 A * | 9/1998 | Wood .................. | G09B 17/006 434/167 |
| 5,997,304 A * | 12/1999 | Wood .................. | G09B 17/006 434/167 |
| 6,009,397 A * | 12/1999 | Siegel ................. | G06F 16/40 434/167 |
| 6,364,274 B1 * | 4/2002 | Omi .................... | F16F 15/022 248/580 |
| 2008/0233546 A1 * | 9/2008 | Baker .................. | G09B 5/06 434/169 |
| 2020/0170422 A1 * | 6/2020 | Goppion ............. | A47F 3/001 |

FOREIGN PATENT DOCUMENTS

WO    WO-2017206967 A1 * 12/2017 ............ G09B 1/06

OTHER PUBLICATIONS

Watts, David. "Talk Box: ISD1820 Voice Recorder." YouTube, YouTube, Aug. 22, 2018, www.youtube.com/watch?v=ZQLUBOwswfM. (Year: 2018).*
Math Equipment & Resources 2018, Modern Teaching Aids, Sydney, Australia, 2018. (Year: 2018).*

* cited by examiner

*Primary Examiner* — Xuan M Thai
*Assistant Examiner* — Zachary Joseph Pollock
(74) *Attorney, Agent, or Firm* — Kenneth L. Tolar

(57) ABSTRACT

An educational tool includes a housing that either encloses a visible three-dimensional object or has a geometric outline that resembles a particular shape. The common name of the object or shape is imprinted in large lettering on the front surface of the housing. When a child depresses the housing, an audible recording is emitted that describes the displayed object or shape.

13 Claims, 1 Drawing Sheet

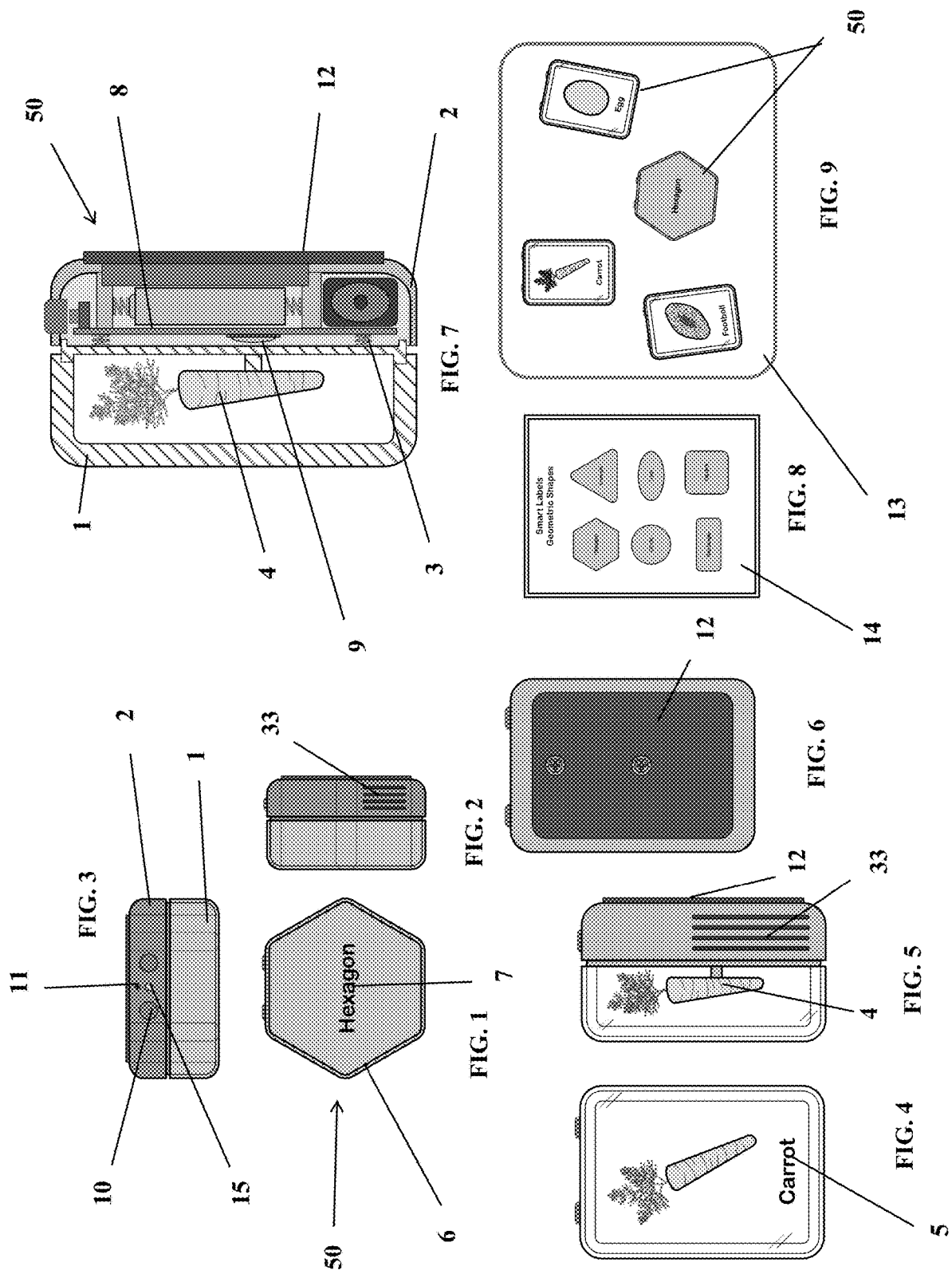

INTERACTIVE EDUCATIONAL TOOL

CROSS REFERENCE TO RELATED APPLICATIONS

This application claims priority of provisional application No. 63/146,594 filed on Feb. 6, 2021, the specification of which is incorporated herein by reference.

BACKGROUND OF THE INVENTION

The present invention relates to an interactive educational tool that verbalizes the name of a given object or shape while displaying a three-dimensional model thereof.

DESCRIPTION OF THE PRIOR ART

Children typically learn the identity of certain objects by viewing a book or poster with a two-dimensional depiction adjacent to a printed word describing the object. With the assistance of an instructor, the child must then use imagination to visualize the actual appearance of the three-dimensional object. Eventually, most children comprehend the appearance and identity of the object as he or she repeatedly encounters the actual object in daily life. However, some children struggle with translating two-dimensional depictions of objects into three-dimensional visualizations and quickly fall behind their peers.

Accordingly, there is currently a need for an educational tool that more effectively communicates the identity and actual appearance of three-dimensional objects to children. The present invention addresses this need by providing an educational tool that presents a three-dimensional model of an object and audibly describes the object upon receipt of a predetermined command.

SUMMARY OF THE INVENTION

The present invention relates to an educational tool comprising a housing that either encloses a visible three-dimensional object or has a geometric outline that resembles a particular shape. The common name of the object or shape is imprinted in large lettering on the front surface of the housing. When a child depresses the housing, an audible recording is emitted that describes the displayed object or shape.

It is therefore an object of the present invention to provide an educational tool that conveniently identifies three-dimensional objects and shapes.

It is therefore another object of the present invention to provide an educational tool that audibly describes a shape or object while displaying a three-dimensional model thereof.

It is yet another object of the present invention to provide an educational tool that emits an audible description of a displayed three-dimensional object.

Other objects, features, and advantages of the present invention will become readily apparent from the following detailed description of the preferred embodiment when considered with the attached drawings and the appended claims.

BRIEF DESCRIPTION OF THE DRAWINGS

FIG. 1 is a front, plan view of a first embodiment of the educational tool according to the present invention.

FIG. 2 is a side view of the embodiment of FIG. 1.

FIG. 3 is a top view of the embodiment of FIG. 1.

FIG. 4 is front, plan view of a second embodiment of the educational tool.

FIG. 5 is a side view of the embodiment of FIG. 4.

FIG. 6 is a rear view of the embodiment of FIG. 4.

FIG. 7 is a cross-sectional view of the embodiment of FIGS. 4-6.

FIG. 8 is an isolated view of the accompanying poster.

FIG. 9 is an isolated view of the ferromagnetic whiteboard with a plurality of units mounted thereon.

DESCRIPTION OF THE PREFERRED EMBODIMENT

The present invention relates to an educational tool comprising a housing 50 formed of a front section 1 and a rear section 2. The two sections have interposed biasing springs 3 so that the front section moves slightly toward the rear section when depressed but returns to an original position when released. If the unit is designed to identify a particular object, the front section is transparent and a model 4 of the object is secured to an inner surface of the rear section 2. The common name 5 of the object is imprinted in large lettering on the front section, preferably immediately beneath the object. If the unit is identifying a given shape, the housing 6 has a geometric outline that resembles the shape and includes the appropriate textual identifier 7 imprinted on the front section. The front section would also be constructed with an opaque, brightly colored polycarbonate or similar material.

Within the rear section is a microprocessor 8 and associated electronics that store and play a voice recording that describes the displayed object or the given shape. The recording is emitted by a pressure-sensitive switch 9 positioned adjacent the rear surface of the front section. Accordingly, when a child depresses the front section, its rear surface engages the switch and activates the recording to audibly describe the object or shape. The recorded message is emitted through a speaker 33 on a side of the housing.

On a side edge of the housing are a pair of manually operable switches, one 10 for recording a customized message to replace the existing message and another 33 for adjusting the volume of the recorded message. The switches 10, 33 are normally inoperable unless a parent or supervisor inserts a pin or needle into a receptacle 11 to release a security lock. An LED 15 is illuminated when the security lock has been successfully released, or pulses when the internal batteries are nearing exhaustion and require replacement.

A magnetic panel 12 on the rear surface of the housing allows the device to be mounted on a refrigerator or similar ferromagnetic support surface. The tool also includes a ferromagnetic whiteboard 13 for simultaneously suspending multiple housings to provide the convenience of a conventional posterboard. Therefore, an instructor can display a multitude of different objects and shapes on a single surface while having the additional benefit of three-dimensional models and audible descriptions.

Preferably, a number of different units identifying a combination of shapes and three-dimensional objects are provided as a set to allow a parent, teacher or caregiver to more efficiently educate a child about numerous shapes and objects. Therefore, each set includes a poster 14 with graphical depictions of the items within the set to supplement the additional educational tool. For example, the poster could provide a graphical representation of how the units should be arranged on the whiteboard to further improve the child's organizational skills.

The above-described device is not limited to the exact details of construction and enumeration of parts provided herein. For example, though the device has been primarily depicted and described as having a basic microprocessor and manually operable activation buttons, it could instead include a more complex processor and a universal asynchronous receiver-transmitter (UART) module. The microprocessor could be programmed with a smart phone and a designated application using a wireless communication link, such as the commonly marketed and solder under the trademark Bluetooth™. Therefore, the manually operable buttons could be eliminated, and the device could be conveniently programmed from a remote location. Furthermore, the size, shape, and materials of construction of the various components can be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. An educational tool comprising:
    a housing having an interior chamber, a front section and a rear section with biasing springs positioned between said front section and said rear section so that the front section moves slightly toward the rear section when depressed but returns to an original position when released;
    a three-dimensional object displayed by said housing;
    means for emitting a verbal description of the three-dimensional object when said front section is depressed.

2. The educational tool according to claim 1 further comprising text adjacent the three-dimensional object that identifies the object.

3. The educational tool according to claim 1 wherein the front section is transparent and the three-dimensional object is received within the interior chamber of said housing.

4. The educational tool according to claim 1 wherein the housing has a geometric outline that resembles the three-dimensional object.

5. The educational tool according to claim 1 wherein said means for emitting a verbal description of the three-dimensional object when said front section is depressed comprises:
    a voice processor within said interior chamber that stores and plays a voice recording that describes the displayed object;
    a first switch in communication with the voice processor and adjacent the front section whereby when a user depresses the front section, the front section actuates the first switch to emit the voice recording to audibly describe the object.

6. The educational tool according to claim 5 further comprising a second switch on said housing that allows a user to record a customized message.

7. The educational tool according to claim 6 further comprising a third switch on said housing for adjusting a volume of the voice recording.

8. The educational tool according to claim 7 comprising a security lock for disabling said second switch and said third switch to prevent operation by a child.

9. The educational tool according to claim 8 wherein said security lock is a fourth switch within a small recess that is only accessible with a designated tool.

10. The educational tool according to claim 9 further comprising an LED on said housing that is illuminated when said security lock has been successfully released.

11. The educational tool according to claim 1 further comprising a magnetic panel on said rear section to allow the housing to be mounted on a ferromagnetic support surface.

12. The educational tool according to claim 11 further comprising a ferromagnetic whiteboard for suspending multiple housings.

13. The educational tool according to claim 12 further comprising a poster with graphical depictions of the multiple housings to provide a visual guide for positioning the multiple housings on the whiteboard.

\* \* \* \* \*